United States Patent [19]
Ellison

[11] Patent Number: 5,979,175
[45] Date of Patent: Nov. 9, 1999

[54] PORTABLE INSULATED COOLER WITH BUILT-IN AUDIO SYSTEM

[76] Inventor: Peter L. Ellison, 11 S. Austin Blvd., Chicago, Ill. 60644

[21] Appl. No.: 09/159,721

[22] Filed: Sep. 24, 1998

Related U.S. Application Data

[60] Provisional application No. 60/060,270, Sep. 29, 1997.
[51] Int. Cl.⁶ .................................................... F25D 3/08
[52] U.S. Cl. ........................... 62/457.7; 455/351; 381/90
[58] Field of Search ............................................. 62/457.7

[56] References Cited

U.S. PATENT DOCUMENTS

| | | | |
|---|---|---|---|
| 4,700,395 | 10/1987 | Long | 381/90 |
| 5,235,822 | 8/1993 | Leonovich | 62/457.7 |
| 5,447,041 | 9/1995 | Piechota | 62/457.7 |
| 5,781,853 | 7/1998 | Johnson | 455/351 |

*Primary Examiner*—Henry Bennett
*Assistant Examiner*—Melvin Jones

[57] ABSTRACT

The present invention relates to a portable recreational cooler in combination with an audio system. The audio system is mounted in the hinged lid and suitable speakers and wiring are located in the cooler sidewalls. Covers are provided to protect the system from the environment.

2 Claims, 2 Drawing Sheets

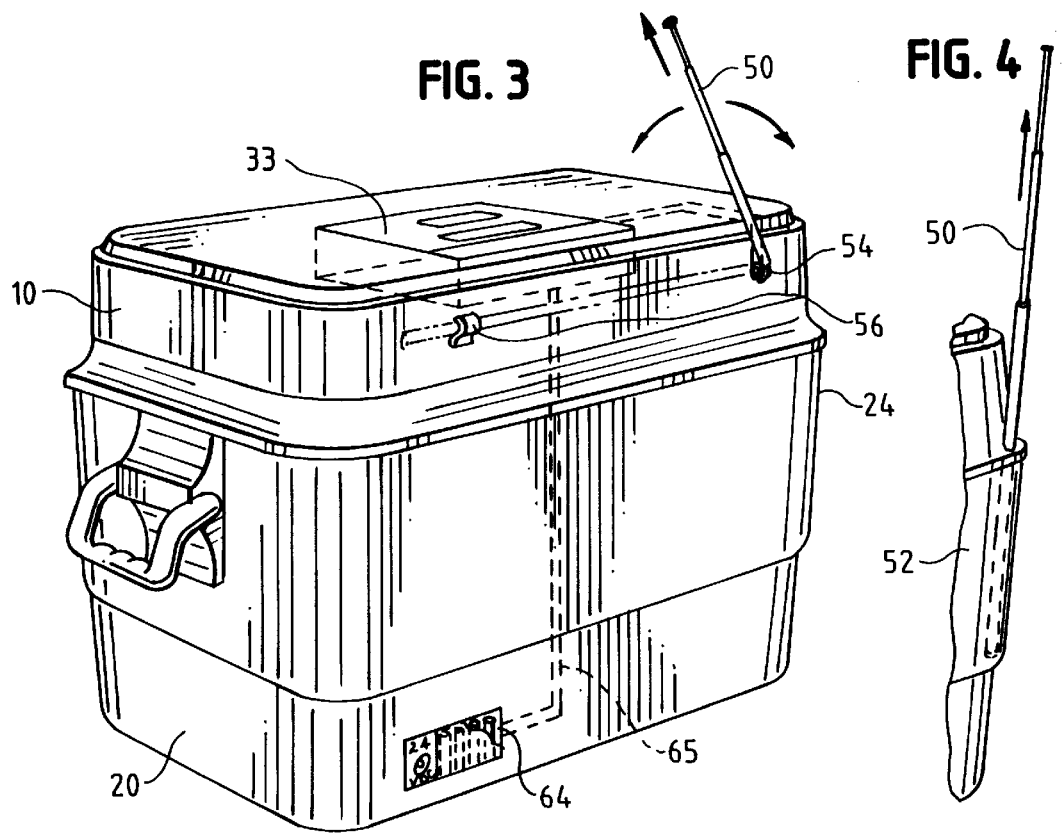
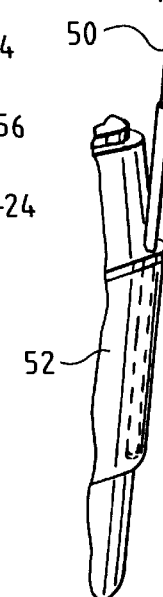
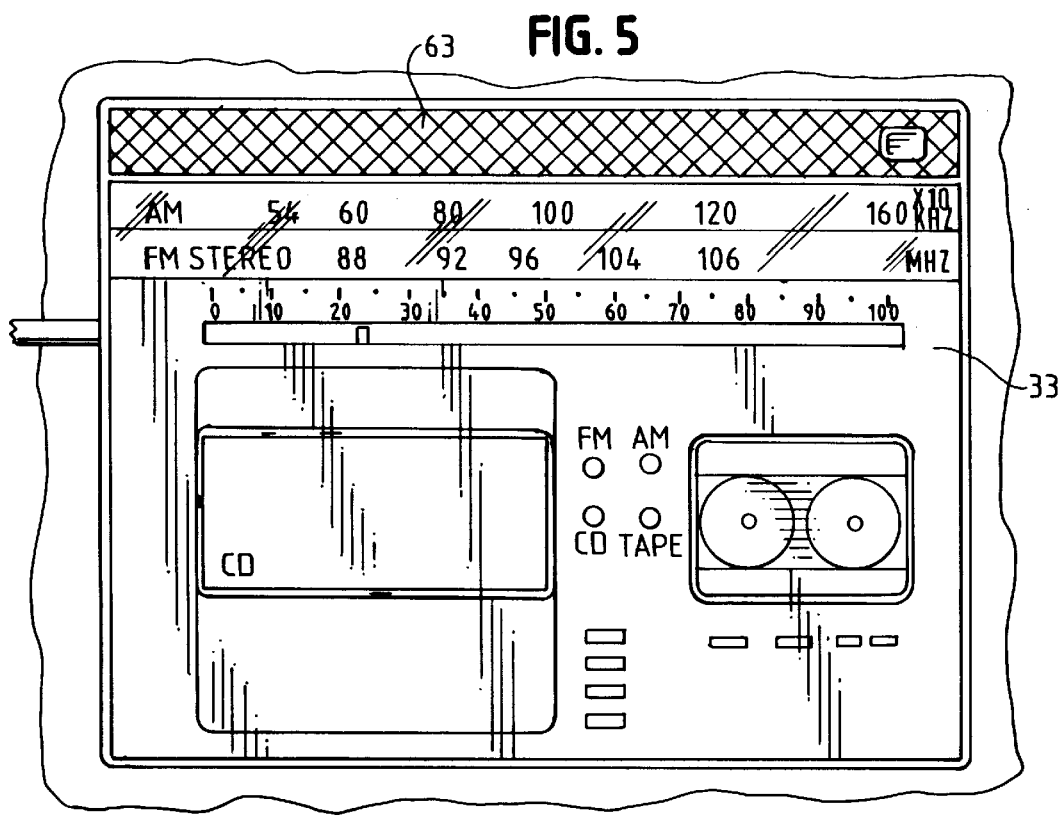

PORTABLE INSULATED COOLER WITH BUILT-IN AUDIO SYSTEM

This application claims benefit of provisional application Ser. No. 60/060,270, filed Sep. 29, 1997.

BACKGROUND

Portable insulated coolers and portable audio systems are used in the workplace and for recreational activities such as going to the beach. The devices are sometimes used coincidentally, and it is acknowledged that the prior art broadly teaches that the two devices can be combined. However, there are few if any such audio/coolers available in the marketplace that have the advantages of durability and light in weight.

Most such prior art audio/coolers have the audio system mounted into a sidewall of the cooler, causing the cooler to be unbalanced and making carrying the cooler more difficult. Furthermore, because the audio unit in such audio/coolers are usually mounted into a sidewall, a large amount of the audio unit's surface area is exposed to sand, salt-water, and other environmental hazards. Other audio/coolers have means for protecting the audio unit, but such protection means are cumbersome and expensive, don't protect the audio source unit when in use, and have more moving parts subject to breakage. The present invention provides a portable insulated cooler with a built-in audio system mounted so as to provide balance and ease-of-carrying, to provide a simple, practical and inexpensive means of protecting the audio unit from the environment, and to provide additional lighting and storage means.

DESCRIPTION OF THE INVENTION

The invention is a lightweight, portable insulated cooler with a built-in audio system. The audio system is comprised of an audio source unit built into a cooler lid, and speakers, antenna and power source built into cooler sidewalls.

The audio source unit is built into the cooler lid. The audio unit is mounted generally over the cooler's center of gravity, making the cooler more balanced than if the audio source unit was mounted into a cooler sidewall. The audio unit is secured to the cooler lid by removable fasteners attached through the bottom side of the cooler lid, so that the audio unit can be removed for repair or replacement by removing the fasteners, but the fasteners are not showing when the cooler lid is closed. The audio source unit can include radio, compact disc, or cassette tape, or video such as television, or a personal computer such as a laptop, or any combination of these. The audio unit is back-lit so the audio controls are visible at night.

The audio unit is mounted in the lid so only one face of the audio unit is showing through a sidewall of the lid. The audio unit face contains the audio controls and openings for horizontally inserting a compact disc or cassette tape, similar to an automobile audio receiver. The exposed surface area of the audio unit is thereby minimized, providing the least possible exposure to the environment. A substantially flat protective cover is built into the cooler lid sidewall, and slides over the face of the audio unit to provide protection from the environment. The protective cover can be easily slid open to choose a mode and selection of music, and then easily slid back close to protect the audio unit while it is in use. The protective cover can be made of a see-through material such as a durable, rigid, clear plastic so the audio controls can be viewed while the protective cover is closed. The protective cover can be made of an opaque material for security concerns so the audio unit can not be seen when the cover is closed.

Other embodiments of the invention have the audio unit mounted generally in the center of the cooler lid. Two embodiments have the audio controls and tape/CD openings accessed only from the bottom side of the cooler lid, so the controls and tape/CD openings are completely hidden, inaccessible, and protected from the outside environment when the cooler lid is closed. In one of these embodiments, the audio unit is built into the bottom side of the cooler lid, so only the face of the audio unit with the audio controls and tape/CD openings is accessible, and has a substantially flat protective cover that slides over the face of the audio unit. In the other embodiment, the audio unit is mounted onto and protrudes from the bottom side of the cooler lid, and has a hinged and/or snap-on protective housing cover. The audio controls and tape/CD openings can be located on a side of the audio unit parallel with the cooler lid bottom, thus providing for minimum audio unit height and maximum cooler volume capacity. Alternatively, the audio controls and tape/CD openings can be located on a side of the audio unit normal to the cooler lid bottom, thus providing for minimum surface area exposure of the tape/CD openings.

Another embodiment of the invention has the audio unit built into the top side of the cooler lid, so only the face of the audio unit with the audio controls and tape/CD openings is accessible, and has a substantially flat protective cover that slides over the face of the audio unit.

Another embodiment of the invention has the audio unit mounted through the cooler lid. A face of the audio unit with the audio controls is accessible only from the top side of the cooler lid, and has a substantially flat protective cover that slides over the face of the audio unit. Another face of the audio unit with the tape/CD openings is accessible only from the bottom side of the cooler lid, and has a substantially flat protective cover that slides over the face of the audio unit.

Another embodiment has the audio controls on a rotatable rod, with the rod connected to the audio unit on one end and to a control knob assembly on the other end, and with the rod extending through a sidewall of the cooler lid. The control knob assembly is almost flush with the cooler lid sidewall, so the length of the control rod between the cooler lid sidewall and the knob assembly is minimized thereby minimizing the risk of rod breakage. The audio volume, tuning, and other controls can thereby be adjusted while the cooler lid is closed.

The speakers are mounted into the front sidewall of the cooler. Low profile speakers are preferable, because of the minimal cooler side wall thickness available in which to install the speakers and because of the generally smaller and lighter speaker magnets. Generally, two speakers are preferred for stereo sound, but more or fewer speakers may be used.

Another embodiment of the invention has miniature speakers mounted in the cooler lid. Another embodiment does not have speakers integrally mounted into the cooler, but instead has speaker jacks for plugging in separate speaker units.

The audio unit may be powered by AC or DC voltage or solar panels may be included for utilizing solar energy. The cooler has a compartment in a rear sidewall that receives DC batteries, and includes a jack that accepts an electrical cord that plugs into an automobile lighter socket, an AC adapter jack that accepts an electrical cord that plugs into a household outlet, and storage space for electrical cords. The compartment has an opening through the sidewall of the cooler, and a slide and/or snap off cover. The lower rear sidewall location helps balance the weight of the speakers in the front sidewall of the cooler. Another embodiment has the power source compartment such as solar panels located in the cooler lid.

The antenna is sectionalized, so that it may be fully or partially extended for use or retracted for storage. The antenna extends vertically through a cooler sidewall at a cooler sidewall corner, so that in the extended position the antenna is upwardly vertically extended and in the storage position the antenna is retracted down into the sidewall with only the head of the antenna showing. In another embodiment, the antenna is hingedly attached to a sidewall, and can be extended to a plurality of positions for receiving signals or retracted to a storage position where it is secured by a latch mounted to the sidewall.

The cooler includes a light assembly mounted adjacent to or near the audio unit, to provide a lighting means at night. The light unit snaps into a socket fixedly mounted into the cooler or cooler lid, so the light unit can be removed from the socket for directing the light beam, for example, into the cooler or the storage drawer. The wiring from the power source to the light unit has an extra length, so the length of wire permits a free range of motion of the light unit when the light unit is removed from the socket, and the wire can be stored in a recess in the socket when the light unit is mounted in the socket.

All wiring is internal to the cooler walls so that no wiring is exposed, including wiring from the power source to the audio unit and to the light assembly, and from the audio unit to the speakers and to the antenna.

There are drawers in the cooler bottom for storing tapes, CD's, etc. There is also provided a remote control unit for remote control of the audio unit, and a holder for the remote control unit mounted to an inner sidewall of the cooler lid. The cooler and audio system may have an outer surface design such as pastel colors, neon colors, camouflage, or another design.

One embodiment of the invention has the entire audio system, including the audio source unit, the speakers or speaker jacks, the power source compartment, the antenna, the light assembly, and all wiring, all mounted in the cooler lid. This embodiment provides for especially simple and inexpensive manufacture. The lid can sold with a new cooler, or be retrofit onto existing coolers already in use.

DESCRIPTION OF THE DRAWINGS

FIG. 1 also shows the sliding protective cover (12) for the audio unit (30). FIG. 1 also shows the speakers (40) mounted into the front cooler sidewall (20). FIG. 1 illustrates storage drawers (60) mounted into the cooler bottom (26) and a general purpose light (66) removably attached to a socket (67) fixedly mounted into a cooler sidewall adjacent the audio unit controls.

FIG. 2 also shows the protective housing cover (33) for the audio unit (32) and another embodiment with the audio control rod (34) with the knob assembly (36). The remote control unit and holder (62) is mounted onto a cooler lid inner sidewall (18).

FIG. 3 is a perspective view showing an audio unit (33) mounted generally in the center of the cooler lid (10). FIG. 3 also illustrates the power source compartment (64) mounted into the rear cooler sidewall (24) with the protective cover not shown. The antenna (50) with a hinged attachment (54) is connected to a sidewall and secured by a latch (56). The wiring (65), is all internal to the cooler walls.

FIG. 4 is a partial perspective view of a cooler sidewall corner (52), showing the antenna (50) extendedly mounted through the cooler sidewall corner (52).

FIG. 5 is plan view of an audio unit (33), and shows another embodiment of a general purpose light (63) mounted adjacent or near the audio unit (33).

Figure 1:
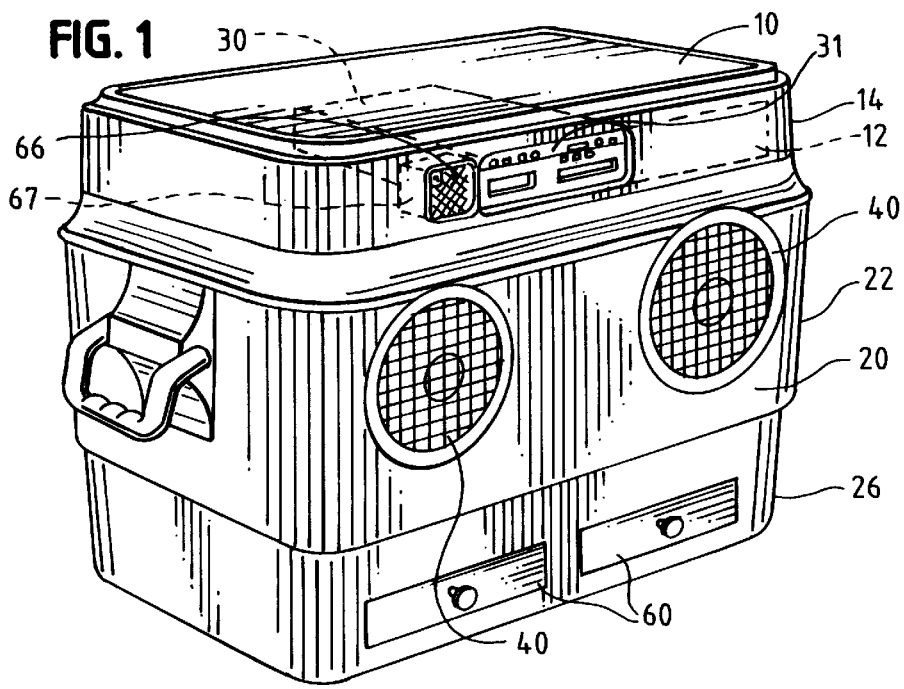
FIG. 1 is a perspective view showing an audio unit (30) mounted into the cooler lid (10), so only the audio unit face (31) with the audio controls and CD/tape openings is showing through the front cooler lid sidewall (14).
Figure 2:
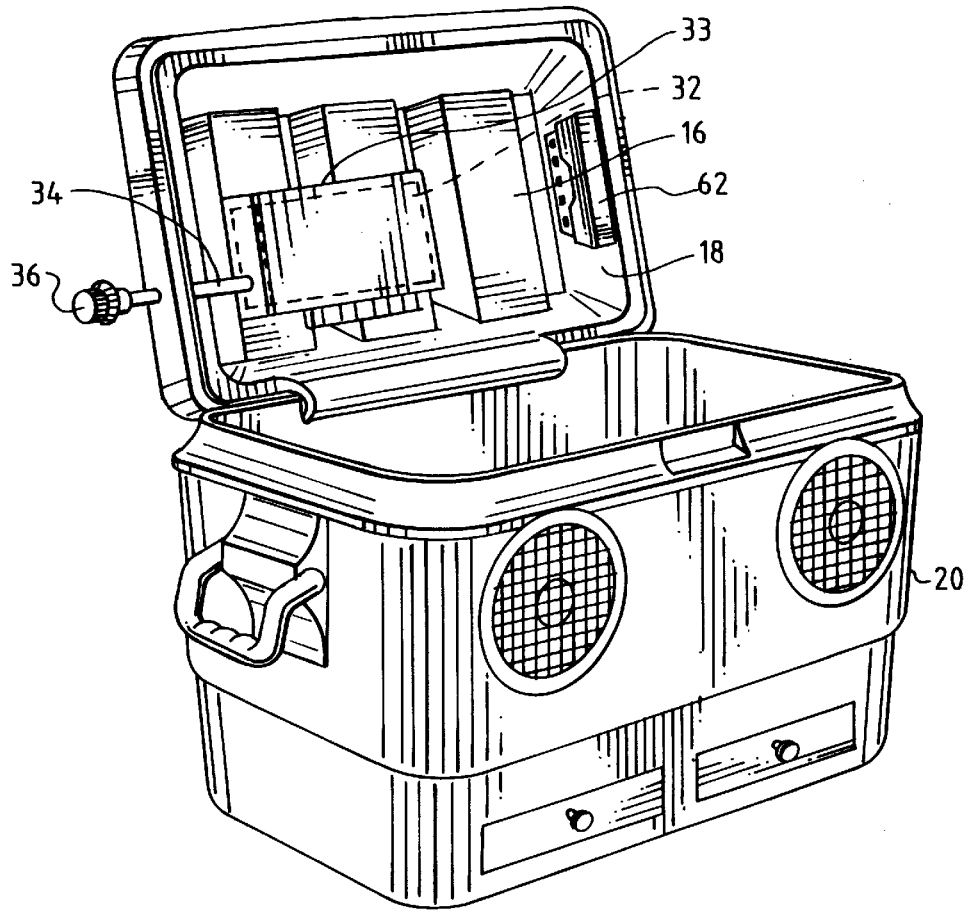
FIG. 2 is a perspective view of another embodiment illustrating an audio unit (32) mounted onto the cooler lid bottom side (16) so the audio unit (32) is completely hidden, inaccessible and protected when the cooler lid (10) is closed.

It is intended to cover by the following claims all embodiments, which come within the true spirit and scope of the invention.

What is claimed:

1. A recreational cooler and audio system comprising an enclosure having an outer bottom wall, outer side walls and a closure defining an insulated chamber, an audio unit in said closure, a light removably attached to a socket fixedly mounted in said closure adjacent the audio unit, a sliding protective cover mounted in said closure for protecting said audio unit, speakers in one of said side walls, a power source in one of said side walls and wiring means in one of said side walls and said closure for connecting said power source and audio unit.

2. A recreational cooler and audio system comprising an enclosure having an outer bottom wall, outer side walls and a closure hinged to a side wall defining an insulated chamber, an audio unit and a remote control unit for remotely operating the audio system mounted on the under side of the hinged closure whereby the audio unit and remote control unit are completely hidden, inaccessible and protected when the closure is closed.

* * * * *